United States Patent [19]

Hedrich

[11] 4,049,244
[45] Sept. 20, 1977

[54] APPARATUS FOR THE HIGH-SPEED MIXING AND DEGASIFICATION OF VISCOUS MATERIALS ESPECIALLY SYNTHETIC RESIN

[75] Inventor: Wilhelm Hedrich, Katzenfurt, Germany

[73] Assignee: Firma Wilhelm Hedrich Vakuumanlagen, Katzenfurt, Germany

[21] Appl. No.: 618,923

[22] Filed: Oct. 2, 1975

[30] Foreign Application Priority Data

Dec. 3, 1974 Germany ............................ 2457001

[51] Int. Cl.² .......................... A21C 1/00; A23G 1/00; B01F 7/16; B01D 19/00
[52] U.S. Cl. ...................................... 259/185; 259/8; 55/190; 55/195
[58] Field of Search ............................ 259/87, 23–24, 259/43–44, 107–108, 122, 185; 55/41, 189–190, 192, 195, 199, 267, 467; 34/11, 102

[56] References Cited

U.S. PATENT DOCUMENTS

| | | | |
|---|---|---|---|
| 2,944,626 | 7/1960 | Douglas | 55/190 |
| 3,229,449 | 1/1966 | Hogue | 55/195 |

FOREIGN PATENT DOCUMENTS 11,946  6/1893  United Kingdom ................... 34/102

*Primary Examiner*—Harvey C. Hornsby
*Assistant Examiner*—Robert Pous
*Attorney, Agent, or Firm*—Karl F. Ross

[57] ABSTRACT

Apparatus for the high-speed mixing and degasification of viscous materials, especially synthetic resins with and without fillers, wherein two or more reactive components are mixed in an upright container having a downwardly converging portion extending over the lower one third of the vessel, by mixing vanes rotated along the frustoconical wall and carried by a worm or screw extending vertically through a sleeve or mixing tube orbited by the vanes. The screw carries the material to be mixed continuously upwardly through the tube and dispenses it along a downwardly and outwardly diverging apron in a thin layer. The continuous path is heated in sections and the vessel is evacuated.

7 Claims, 3 Drawing Figures

APPARATUS FOR THE HIGH-SPEED MIXING AND DEGASIFICATION OF VISCOUS MATERIALS ESPECIALLY SYNTHETIC RESIN

Field of the Invention

My present invention relates to a method of and to an apparatus for the continuous and extremely rapid homogeneous mixing and intensive designation or thickening of synthetic compositions consisting of a number of components and primarily synthetic resins or the like with or without fillers.

Background of the Invention

In the production of shaped articles from synthetic resins and other synthetic materials to obtain high-strength bodies, with or without fillers, it is known to provide mixing devices in vessels under vacuum to which the components of the synthetic composition are fed from storage receptacles also under vacuum by metering pumps.

As soon as the hardener or curing component is combines with the remainder of the composition, a reaction time commences within which the components must be mixed preferably homogeneously and are degassed.

It has been found that, especially for the production of high-value electrically insulating objects or bodies, the conventional mixing arrangements cannot achieve the desired properties of the mixture because it is either not possible to achieve a homogeneous mixture simultaneously with intensive degasification or either homogeneous mixing or intensive degasification cannot be effected within the limited reaction time which is available.

In addition to the fact that the reaction time is relatively small and thus degasification must be particularly intensive and a homogeneous state must be reached at an early point following adding of the reactive components, the compositions generally are highly viscous masses which tend to retain gas and moisture inclusions so that the gas and moisture is not readily released by simple mixing.

For instance, with highly viscous and pasty compositions, intensive mixing tends to trap gases deep within the mixture so that even with application of high vacuum to the vessel, the composition contains residual gas.

The residual gas can be removed by a forceful agitation which has been found to be practical for very low viscosity media.

For highly viscous meterials an undesirable long mixing time is necessary and this, of course, is incompatible with the short reaction time within which mixing and degasification must occur.

Various techniques have been proposed to overcome these disadvantages. For example it has been suggested to introduce the mass to be mixed and degassed into an evacuated cylinder and force it through a series of perforated plates which are moved back and forth by a rod. The disadvantage of this arrangement is that the pressing of the mass through the perforated plates results in extrusion of individual relatively dense strands which tend to retain gas particles to some extent although some gas is released. The retained gas particles are trapped even more firmly in the mass. In practice it is found that the reaction time for most synthetic resins is too short to allow degasification by his perforated plate technique.

According to a further proposal, the synthetic resin material is introduced into a vessel maintained under vacuum and is shifted to a further heated vacuum vessel and from the latter to an extruder worm. Ahead of the latter, the gas which is pressed out is led from a collection chamber.

German Auslegeschrift No. 1,544,168 describes a process in which the material to be degasified is advanced by a worm through a horizontal evacuated vessel, the worm being designed to distribute the material in a relatively short time in a thin layer which tends to degas rapidly. For certain compositions, this device has been found to be effective while other compositions with other mixing and reaction times and properties are not as effectively degassed or mixed. In fact, if it is desired to increase the mixing time, this is only possible with larger and/or longer worms at high cost.

The prior-art devices have also made use of double-wall mixing vessels in which heating and cooling media can be introduced into the jacket around the mixing chamber to control the temperature during mixing. Since the exchange area is only the inner wall surrounded by the jacket, a uniform tempering of the gas in the available reaction time cannot be effected.

OBJECTS OF THE INVENTION

It is an object of the invention to provide a method of and an apparatus for obviating the above-mentioned disadvantages and ensure an extremely rapid, continuous, homogeneous mixture and simultaneously intensive degasification to produce a product with uniform consistency at low cost.

Another object of this invention is to provide a system which is capable of controlling the temperature conditions at which rapid mixing and degasification of reactive synthetic resin mixtures, with or without fillers can be carried out.

SUMMARY OF THE INVENTION

These objects are attained, in accordance with the present invention, by introducing the reactive components one after another into an evacuated vessel provided with agitating vanes sweeping the internal wall of the vessel and conducting the mixture upwardly within a mixing tube to permit the rising mixture to flow over an outwardly and downwardly extending apron back into the portion of the vessel swept by the vanes, the entire movement of the mixture, i.e. its recirculation being continuous. According to the invention the material passes over the apron, which has the configuration of a barb or spur (in cross section), in a thin layer and flows downwardly therefrom into the balance of the mixture in the vessel. Heating and cooling elements are disposed along the tube, the apron and the wall of the vessel and are subdivided into individually controllable sections which regulate the temperature in dependence upon the viscosity of the mixture.

The technological and economical advantages of this method can be enhanced by using the practice thereof a generally cylindrical vessel the lower one third of which frustoconically tapers downwardly and which is provided at its narrow lower end with a cylindrical outlet formed with a discharge valve.

According to a feature of the invention, a mixing tube extends vertically in the vessel and is coaxial therewith, the mixing tube being open at its upper and lower ends spaced from the top and bottom of the vessel. The tube receives a conveyor worm which extends downwardly beyond the bottom of the mixing tube to terminate immediately above the valve. The worm carries a plurality of laterally extending agitators which constitute the vanes or blades mentioned above, these vanes lying close to the frustoconical wall of the vessel and orbiting the mixing tube. The tube is suspended from the cover of the vessel by struts while the drive portion of the worm extends upwardly above the upper end of the tube into the cover on which the drive portion of the worm extends upwardly above the upper end of the tube into the cover on which the drive, e.g. a motor and any appropriate reduction gearing can be mounted.

As noted, the vessel wall, the tube and the apron are provided with sectionally subdivided heating and/or cooling elements which are controlled in response to the temperature and/or viscosity of the synthetic-resin mass at each point along the recirculating path, the elements being individually and preferably steplessly controllable to heat or cool the mass.

It has been found to be advantageous, especially in an open state of the discharge valve, to vary the sense of rotation and speed of the worm. Thus, the worm is driven in one direction or sense to lift the material through the tube and in the other direction to drive the material out through the discharge valve.

It has been found to be advantageous to provide a fitting communicating with the interior of the vessel immediately below the cover of the latter and to provide ahead of this suction pipe a baffle plate intended to prevent solids from entering the vacuum line. The cover which may hermetically seal the vessel and can be removed therefrom, is provided with a viewing window and at least one filling opening. When the heating and/or cooling elements are fluid-fed devices (e.g. jackets) they may be supplied with the heating and cooling medium from three-way distributing valves intended to permit either the heating fluid or the cooling fluid to traverse the elements.

Alternatively and advantageously all or some of the heating or cooling elements can be Peltier-effect (thermocouple) elements which are energized through galvanic contact with the supporting surfaces of the vessel, tube or apron. It has been found to be most advantageous to provide the heating and/or cooling elements of the apron on the upper surfaces of the latter.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
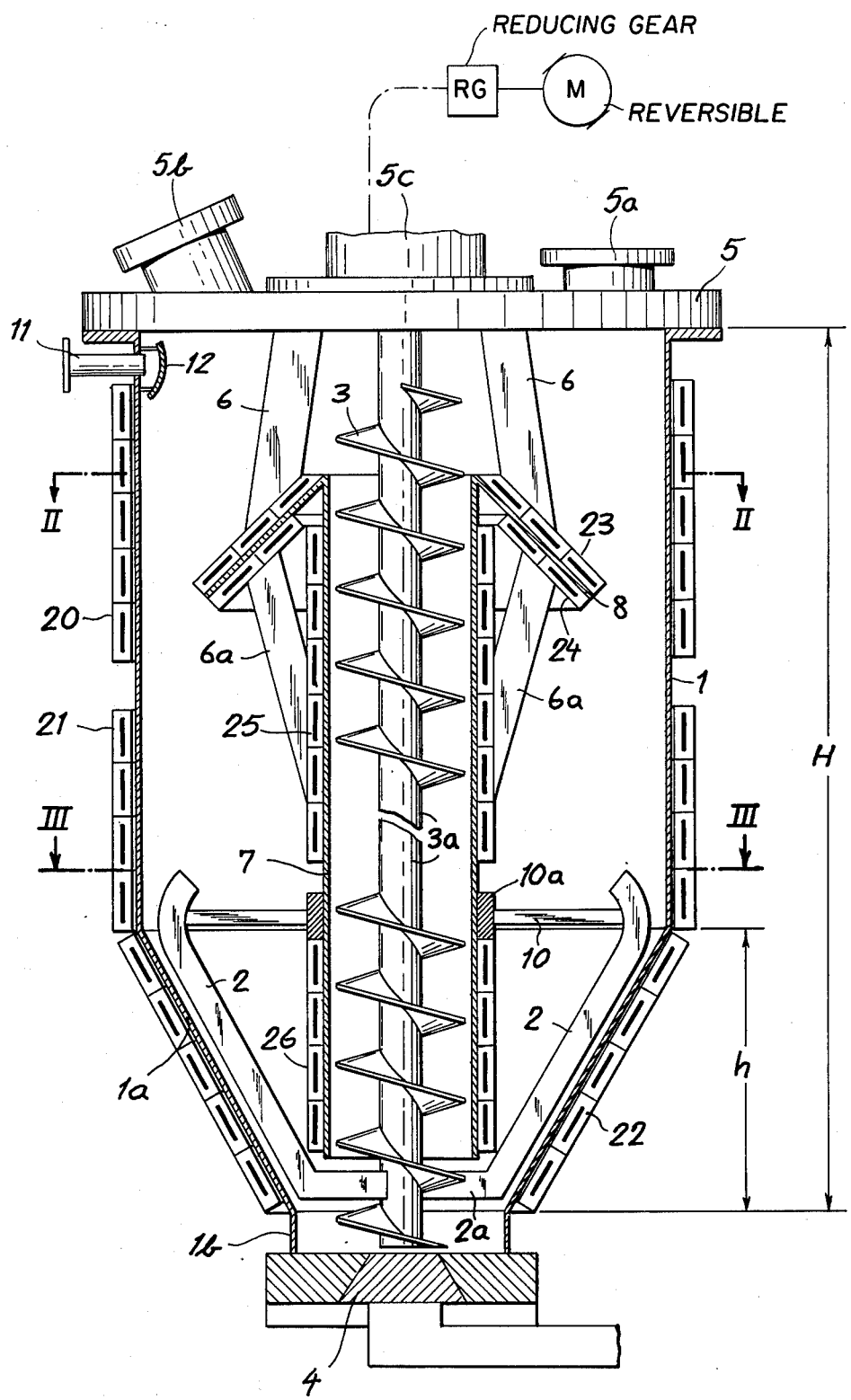
FIG. 1 is an axial cross-sectional view, partly in diagrammatic form, of a mixing vessel according to the invention.
Figure 3:
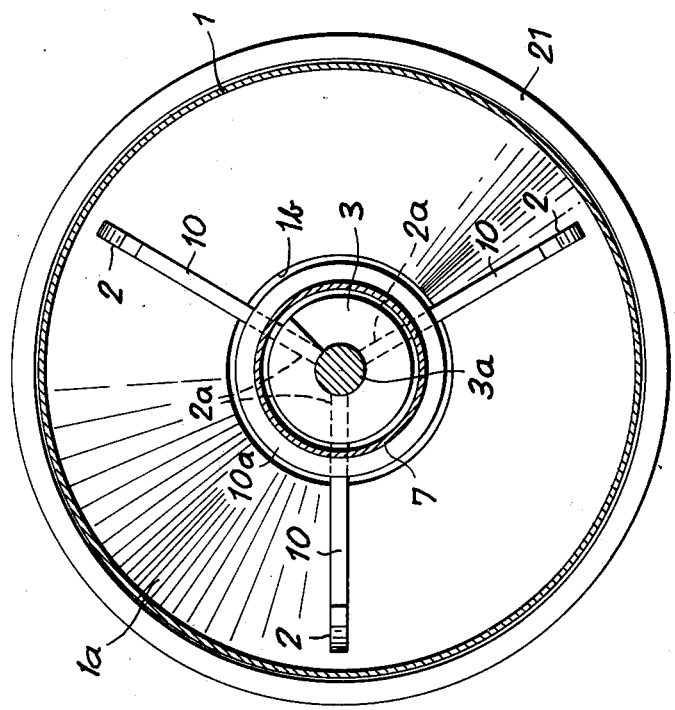
FIG. 3 is a horizontal section along the line III — III of FIG. 1.
Figure 2:
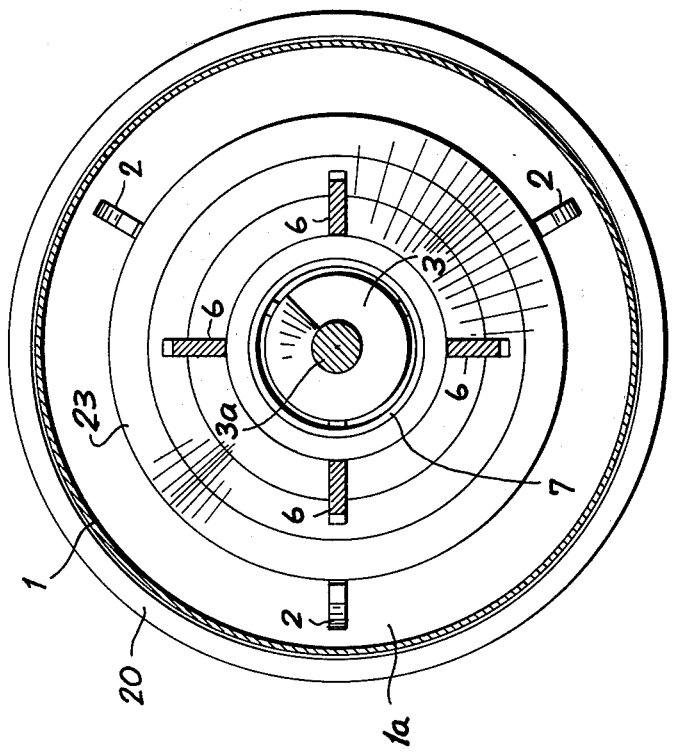
FIG. 2 is a horizontal section along the line II — II of FIG. 1.

The vessel shown in FIGS. 1 – 3 is generally cylindrical at its upper portion 1 and has a downwardly converging frustoconical lower portion 1a whose height h is approximately one third of the total height H of the vessel. This funnel-shaped lower portion terminates in a cylindrical neck 1b provided with a discharge valve 4.

A cover 5 is removable from the upper end of the vessel 1 and can be hermetically sealed to the latter. The cover 5 is provided with at least one inlet fitting 5a which also can be sealed vacuum-tight and, at least one viewing window 5b with a watch glass through which the degassing process can be viewed. A bearing assembly 5c, carried by the cover 5, journals the shaft 3a of a worm 3 which is driven by a motor M and reducing gear assembly RG(not shown), likewise mounted upon the cover. The drive arrangement is preferably of the reversible variable-speed type.

At its upper end, the vessel 1 is provided with a lateral vacuum pipe 11 shielded by a baffle plate 12 which prevents solids from entering the vacuum line. The latter is connected to a suction source such as a vacuum pump.

From the cover 5 struts 6 extend downwardly to carry a tube 7 which is formed at its upper end with a laterally and downwardly divergent frustoconical apron or barb 8, the latter being reinforced by additional struts 6a.

The tube 7 closely surrounds the worm 3 which, at its upper end, extends slightly beyond the tube and, at its lower end also projects therefrom into the cylindrical neck 1b to terminate close to the discharge valve 4.

The mixing vessel is provided with three independent sets of heating and cooling elements 20, 21 and 22 divided into sections and individually controllable automatically during the mixing process in response to the measured temperature and/or viscosity characteristics of the composition. These elements may be individually turned on or off as required. The first set of elements 20 is disposed close to the top of the vessel and surrounds the portion of the container level with the upper end of the inner tube 7 and apron 8. The second set of elements 21 is disposed near the bottom of the cylindrical portion of the vessel 1, while the third set of elements is disposed around the frustoconical lower portion 1a of the vessel.

Identical heating and/or cooling elements 23 – 26, controllable as indicated above, are provided along the outer wall of the tube 7 and on the upper and lower surfaces of the apron 8.

With these sectionally divided heating and/or cooling elements it is possible to regulate the thermal conditions in accordance with the instantaneous state of the mixing within the brief reaction time to obtain optimum mixing and degasification.

Advantageously the heating and/or cooling elements 20 – 26 are Peltier elements in galvanic connection with the metallic vessel 1, tube 7 and apron 8, the heating or cooling effect being controlled as to intensity by varying the current amplitude applied and the selection between heating and cooling being made by electrical polarity reversal.

The mixing process is initiated after the introduction of the components successively through the charging opening in the cover while maintaining the vessel under vacuum. The worm 3, at its lower end, carries a plurality of agitating vanes 2 which are joined to the worm below the tube by arms 2a and may be additionally supported by lateral struts 10 connected to a bearing 10a riding on the tube 7.

The worm 3 causes the material to ride up through the tube 7 and cascade in a thin layer over the apron 8 to the conical lower portion of the vessel where it is mixed by the vanes 2. The system should be operated so that the conical portion 1b of the container remains filled, thereupon causing mixing in this portion, within the tube 7 and upon the apron 8. The free flow of material over the apron in a thin layer ensures residue-free degasification, especially since the recirculation of material allows repeated passage over the apron.

Since the degasification time and the mixing time may vary for different materials, the process can be viewed through the window 5b so that it can be terminated at an optimum point or other parameters can be controlled in dependence upon the observed conditions, e.g. the amount of hardener which is added.

When the mixing process is completed, the worm 3 is reversed and valve 4 is opened to drive the mixed composition from the vessel. This ensures a rapid discharge of the material into the molds or the like to which the composition is to be fed. It has been found in practice that the system described enables dense and highly viscous media to be processed with minimum power of the worm.

I claim:

1. An apparatus for mixing, degassing or thickening a composition comprising a plurality of reactive components, said apparatus comprising:
   a substantially round upright vessel having a lower portion extending over about one third of the height of said vessel and converging downwardly to a cylindrical outlet;
   a discharge valve at said outlet;
   a cover hermetically to and removable from the top of said vessel;
   a worm extending vertically in said vessel and journaled on said cover, said worm reaching downwardly into said cylindrical outlet and terminating just above said valve;
   a fixed mixing tube closely surrounding said worm and opening at its upper and lower ends into the interior of said vessel;
   a laterally and downwardly diverging apron at said upper end of said mixing tube whereby material induced to rise in said tube by rotation of said worm cascades over said apron in a thin layer;
   means for evacuating said vessel;
   agitating vanes on said worm extending along the wall of said lower portion for mixing material therein around the lower end of said tube; and
   temperature-control elements distributed in sections along the walls of said vessel, said tube and said apron for controlling the temperature of material in said vessel.

2. The apparatus defined in claim 1 wherein said elements are controlled in dependence upon the temperature and/or viscosity of the material in said vessel in a stepless manner.

3. The apparatus defined in claim 1 wherein said elements are Peltier elements in galvanic contact with said walls.

4. The apparatus defined in claim 1 wherein said worm is reversible to force material downwardly in said vessel.

5. The apparatus defined in claim 4 wherein said means for evacuating said vessel includes a pipe opening into said vessel at the upper end thereof, and a baffle disposed ahead of said pipe for preventing solids from entering the same.

6. The apparatus defined in claim 4 wherein said cover is formed with at least one viewing window permitting examination of the mixing process in said vessel.

7. The apparatus defined in claim 4 wherein said cover is formed with at least one inlet fitting for introducing components of the composition into said vessel.

* * * * *